United States Patent
Lee et al.

(10) Patent No.: US 8,084,711 B2
(45) Date of Patent: Dec. 27, 2011

(54) APPARATUSES FOR BREAKING A GLASS PANEL UNIFIED WITH A PROCESS TABLE

(75) Inventors: Hun Sik Lee, Chungcheongnam-do (KR); Chang Ha Lee, Chungcheongnam-do (KR); Hun Sang Jung, Daejeon (KR); Hyung Sang Roh, Seoul (KR); Taeho Keem, Chungcheongnam-do (KR)

(73) Assignee: Samsung Corning Precision Materials Co. Ltd., Kyunhsangbuk-do (KR)

( * ) Notice: Subject to any disclaimer, the term of this patent is extended or adjusted under 35 U.S.C. 154(b) by 157 days.

(21) Appl. No.: 12/164,148

(22) Filed: Jun. 30, 2008

(65) Prior Publication Data

US 2009/0188960 A1 Jul. 30, 2009

(30) Foreign Application Priority Data

Jan. 25, 2008 (KR) ................ 10-2008-0007984

(51) Int. Cl.
*B23K 26/00* (2006.01)
(52) U.S. Cl. .................. 219/121.67; 225/96.5
(58) Field of Classification Search ............ 219/121.68; 225/96.5, 94, 103; 313/493, 512, 506
See application file for complete search history.

(56) References Cited

U.S. PATENT DOCUMENTS

| | | | | | |
|---|---|---|---|---|---|
| 3,216,635 A | * | 11/1965 | Lefevre | ............... | 225/96.5 |
| 3,555,737 A | * | 1/1971 | Osamu | ............... | 451/67 |
| 4,948,025 A | * | 8/1990 | Lisec | ............... | 225/104 |
| 5,873,773 A | * | 2/1999 | Bando | ............... | 451/70 |
| 6,836,947 B2 | * | 1/2005 | Yotsumoto et al. | ......... | 29/426.4 |
| 2003/0084643 A1 | * | 5/2003 | Shen | ............... | 53/298 |
| 2004/0040997 A1 | * | 3/2004 | Ueyama et al. | ......... | 225/96.5 |
| 2006/0108461 A1 | * | 5/2006 | Waldron | ............... | 241/99 |

FOREIGN PATENT DOCUMENTS

| | | | |
|---|---|---|---|
| CN | 1496799 A | | 5/2004 |
| JP | EP 1862280 A1 | * | 5/2007 |
| TW | 561134 B | | 11/2003 |
| TW | 587063 B | | 5/2004 |
| TW | 200633808 | | 10/2006 |

* cited by examiner

*Primary Examiner* — Henry Yuen
*Assistant Examiner* — Thien S Tran
(74) *Attorney, Agent, or Firm* — Stein McEwen, LLP

(57) ABSTRACT

Disclosed herein are apparatuses for breaking a glass panel unified with a process table which break the glass panel formed with scribing lines along the scribing lines by irradiating laser beams. The apparatuses for breaking a glass panel unified with a process table to conduct breaking operations of the glass panel after scribing work of the glass panel as one body with the process table are installed on both sides of the process table included in a transfer-type cutting head laser cutting device. Each apparatus for breaking the glass panel unified with the process table comprises: breaking bars for cutting the glass panel by applying pressure to cutting sections of the glass panel; rotating devices for rotating the breaking bars by combining with both ends of the breaking bars; and a support equipped with cylinders for vertically moving the rotating devices in both sections.

12 Claims, 5 Drawing Sheets

APPARATUSES FOR BREAKING A GLASS PANEL UNIFIED WITH A PROCESS TABLE

F. BACKGROUND

1. Technical Field

The present disclosure generally relates to apparatuses for breaking a glass panel unified with a process table, which break the glass panel formed with scribing lines along the scribing lines by irradiating laser beams, and more specifically, to apparatuses for breaking a glass panel unified with a process table to conduct breaking operations of the glass panel after scribing work of the glass panel as one body with the process table, where the apparatuses are installed on either side of the process table in a cutting head transfer-type laser cutting device.

2. Background

In order to cut a glass panel, a glass panel cutting device having a laser is typically used. A glass panel cutting device using a laser forms scribing lines by irradiating laser beams on both sides of a glass panel to be cut, and employs a method of cutting the glass panel formed with the scribing lines with the use of separate breaking apparatuses.

One prior art glass panel cutting device using a laser used a transfer type of process table, in which a process table in which a glass panel is located moves while a laser cutting head is fixed thereto.

FIG. 1 is a perspective view illustrating an overall configuration of a prior art transfer-type process table laser cutting device.

Referring to FIG. 1, the prior art transfer-type process table laser cutting device comprises laser cutting heads(10) for generating laser beams and irradiating the laser beams, a process table(20) for receiving a glass panel thereon and moving the panel in an X-axis direction in order to form scribing lines on both sides of the glass panel by moving the glass panel, and breaking apparatuses(30) for cutting the glass panel formed with the scribing lines.

The transfer-type process table laser cutting device adjusts a cutting width of the glass panel when the laser cutting heads(10) installed on right and left sides of the laser cutting device move in a Y-axis direction along the cutting width of the glass panel before irradiating the laser beams. After the cutting width of the glass panel is adjusted through movement of the laser cutting heads(10) in the Y-axis direction, the process table(20) where the glass panel is placed moves in the X-axis direction to form the scribing lines in the X-axis direction on both sides of the glass panel.

After the process table(20) moves to form the scribing lines on the glass panel, the process table(20) is located on a front side of the laser cutting device. On a front side of the transfer-type process table laser cutting device, the breaking apparatuses(30) are installed in an upper part so as to cut the glass panel formed with the scribing lines on both sides thereof.

FIG. 2(a) and FIG. 2(b) show front views illustrating a figure before and after operation of each breaking apparatus used for the prior art transfer-type process table laser cutting device.

Referring to FIG. 2(a) and FIG. 2(b), each breaking apparatus used for the transfer-type process table laser cutting device comprises a frame(32) for fixing the breaking apparatuses to an upper part of a front side of the laser cutting device, clampers(34) configured to move vertically and disposed on right and left sides of a lower part of the frame(32), and breaking bars(36).

When a process table(20) on which a glass panel(5) formed with scribing lines is located is positioned in the lower parts of the breaking apparatuses(30), the clampers(34) and the breaking bars(36) located under the frame(32) move in a Y-axis direction using a Y-axis linear motor in order to adjust the cutting width of the glass panel(5) along the scribing lines.

As a result of the Y-axis movement of the clampers(34) and the breaking bars(36), the clampers(34) are located on the insides of the scribing lines formed on the right and left sides of the glass panel(5), and the breaking bars(36) are positioned on the outsides of the scribing lines formed on the right and left sides of the glass panel(5).

After adjusting the cutting width of the glass panel(5) by the Y-axis movement of the clampers(34) and the breaking bars(36), the clampers(34) and the breaking bars(36) move to the lower part via cylinders. The clampers(34) fix the glass panel(5) to the process table(20) by falling to a surface in contact with an upper side of the glass panel(5), and the breaking bars(36) fall further than the clampers(34) thereby cutting the cutting sections of the glass panel(5) along the scribing lines.

According to the aforementioned transfer-type process table laser cutting device, the breaking apparatuses of the glass panel conduct breaking operations by being installed at separate positions from the laser cutting heads. This can cause an overall layout space occupied by the laser cutting device of the glass panel to be quite large.

A transfer-type cutting head laser cutting device has been introduced to reduce the layout space required for the transfer-type process table laser cutting device and to increase productivity by reducing the cycle time of a glass panel cutting process. However, the transfer-type cutting head laser cutting device is equipped with a gantry structure for moving laser oscillators and laser irradiation heads in an X-axis direction in an upper part of a process table, which prevent prior breaking apparatuses that apply pressure to a lower part from being installed in upper parts.

G. SUMMARY

Before the present systems, devices and methods are described, it is to be understood that this disclosure is not limited to the particular systems, devices and methods described, as these may vary. It is also to be understood that the terminology used in the description is for the purpose of describing the particular versions or embodiments only, and is not intended to limit the scope.

It must also be noted that as used herein and in the appended claims, the singular forms "a," "an," and "the" include plural references unless the context clearly dictates otherwise. Thus, for example, reference to a "laser" is a reference to one or more lasers and equivalents thereof known to those skilled in the art, and so forth. Unless defined otherwise, all technical and scientific terms used herein have the same meanings as commonly understood by one of ordinary skill in the art. Although any methods, materials, and devices similar or equivalent to those described herein can be used in the practice or testing of embodiments, the preferred methods, materials, and devices are now described. All publications mentioned herein are incorporated by reference. Nothing herein is to be construed as an admission that the embodiments described herein are not entitled to antedate such disclosure by virtue of prior invention. As used herein, the term "comprising" means "including, but not limited to."

It is therefore an object of the disclosed embodiments to provide apparatuses for breaking a glass panel unified with a process table in order to solve a problem of increased overall layout space occupied by a laser cutting device that is present in convention glass panel breaking apparatuses that perform breaking operations of the glass panel at a separate position from scribing work of the glass panel using laser beams.

Also, it is an object of the disclosed embodiments to provide apparatuses for breaking a glass panel unified with a process table so as to solve a problem that a prior glass panel breaking device used to drop breaking bars from an upper part is not installable owing to movement of a gantry structure located in an upper part of the process table where the glass panel is positioned, in case of a transfer-type cutting head laser cutting head.

So as to accomplish the above object, apparatuses for breaking a glass panel unified with a process table disclosed herein comprise: a support formed in a long direction along scribing lines formed on both sides of the glass panel that supports the glass panel in a lower part; vertical movement devices attached to at least one side of the support; and breaking bars formed in an oblong bar shape along the scribing lines, and vertically moving in conjunction with the vertical movement devices by being mounted on upper parts of the vertical movement devices.

In an embodiment, the apparatuses for breaking the glass panel unified with the process table further comprises rotating devices for rotating the breaking bars.

In an embodiment, cutting sections of the breaking bars are formed in a "square without a right side" shape (i.e., three sides of a square), and a plurality of holes are formed on each side of the breaking bars.

In an embodiment, the rotating devices comprise: servo motors for providing rotative power and controlling movement in accordance with the rotative power; a plurality of pulleys for delivering the rotative power generated by the servo motors; and belts for connecting the plurality of pulleys.

In an embodiment, the vertical movement devices include cylinders attached to both sections of the support, the rotating devices are mounted on upper parts of the cylinders, and both ends of the breaking bars are connected to the rotating devices.

In an embodiment, each apparatus for breaking the glass panel unified with the process table further comprises a scrap unit having one side formed as an inclined surface and installed to be positioned on an outer side of the support by fixing both ends thereof to the rotating devices.

In an embodiment, the apparatuses for breaking the glass panel unified with the process table further comprise a plurality of linear guides for moving the support, the vertical movement devices, and the breaking bars in a vertical direction with respect to the scribing lines.

In an embodiment, the apparatuses for breaking the glass panel unified with the process table are installed on both sides of the process table of a laser cutting device which employs a method of moving laser cutting heads.

According to apparatuses for breaking a glass panel unified with a process table as disclosed herein, each breaking apparatus is capable of being installed on either side of a process table of a laser cutting device with the use of a method of breaking the glass panel formed with scribing lines by vertically moving and rotating breaking bars, thereby tremendously minimizing a layout space occupied by the laser cutting device.

In addition, according to the apparatuses for breaking the glass panel unified with the process table, each breaking apparatus, which includes breaking bars which are rotated and move vertically, is individually installed on a respective side of the process table where the glass panel of the laser cutting device is received, thereby being easily usable for a transfer-type cutting head laser cutting device where a gantry structure is located in an upper part.

H. BRIEF DESCRIPTION OF THE DRAWINGS

The advantages of the embodiments disclosed herein will become readily apparent to those skilled in the art from the following detailed description of a preferred embodiment when considered in the light of the accompanying drawings, in which:

FIG. 1 is a perspective view illustrating an overall configuration of a conventional transfer-type process table laser cutting device;

FIG. 2(a) and FIG. 2(b) show front views illustrating a figure before and after operation of each breaking apparatus used for a conventional transfer-type process table laser cutting device;

I. DETAILED DESCRIPTION

Figure 1:
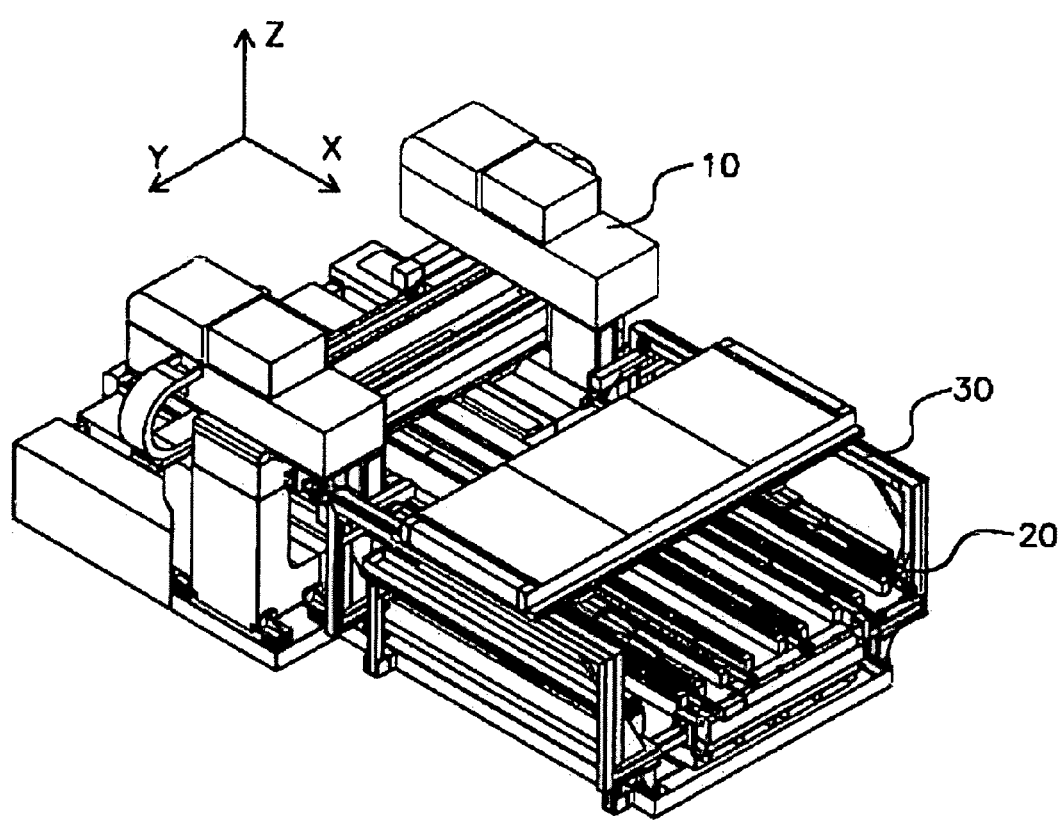
Figure 2:
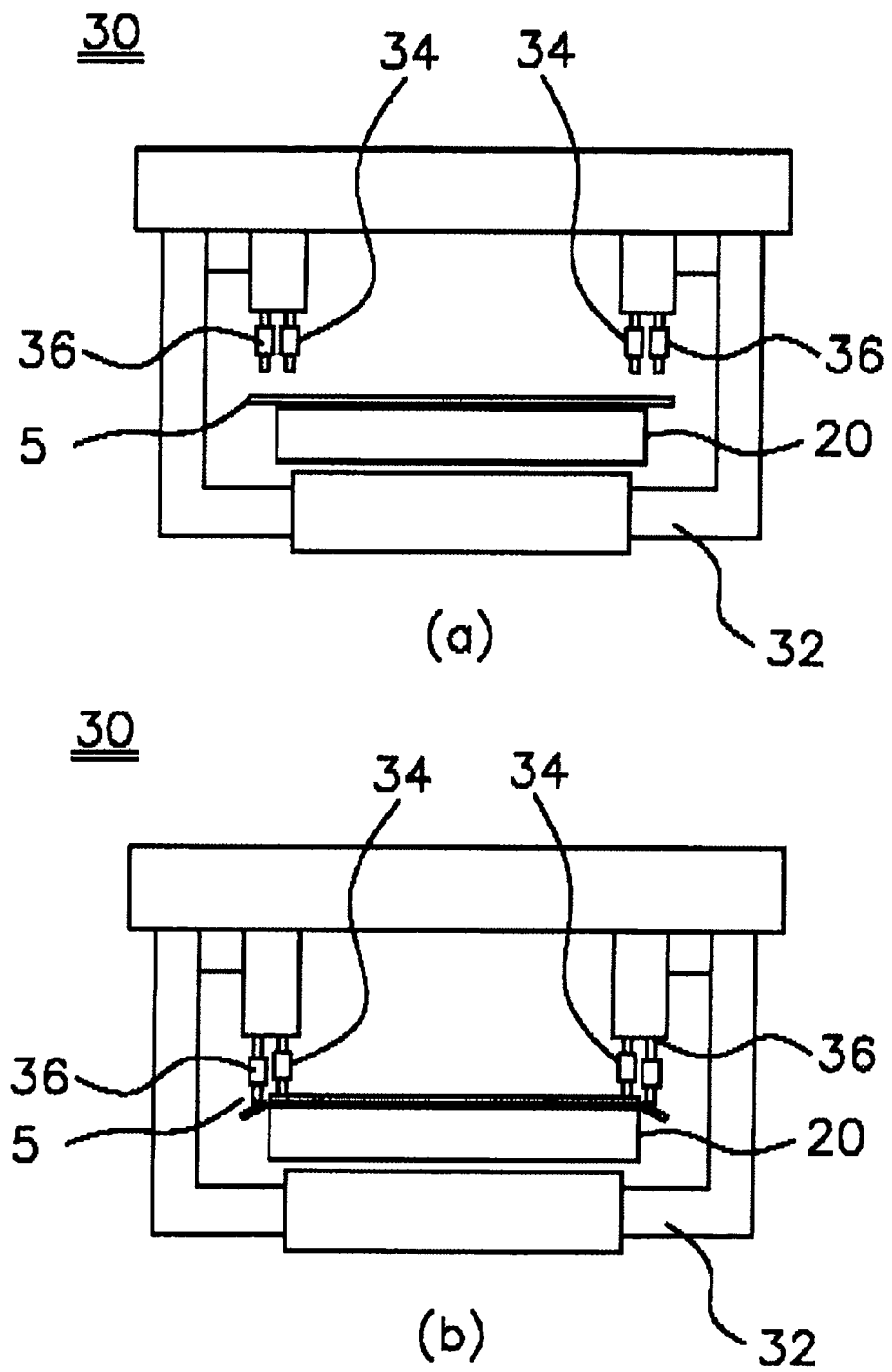
Figure 3:
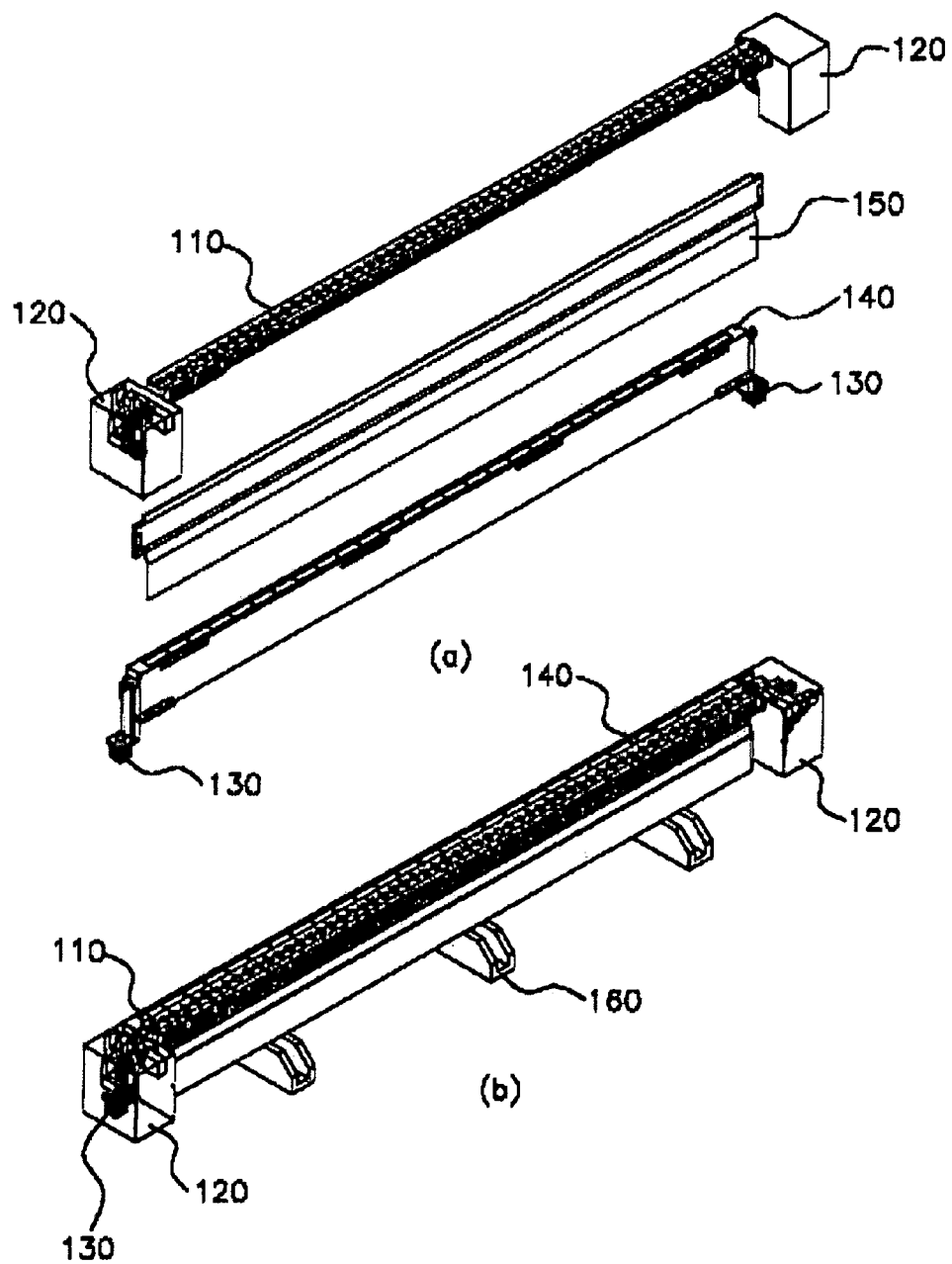
FIG. 3(a) depicts an exploded perspective view of components of an apparatus for breaking a glass panel unified with a process table in accordance with an embodiment.
FIG. 3(b) depicts a perspective view of components of an apparatus for breaking a glass panel unified with a process table in accordance with an embodiment.

FIG. 3(a) depicts an exploded perspective view of components of an apparatus for breaking a glass panel unified with a process table in accordance with an embodiment and FIG. 3(b) depicts a perspective view of components of an apparatus for breaking a glass panel unified with a process table in accordance with an embodiment.

Referring to FIG. 3(a) and FIG. 3(b), an apparatus for breaking a glass panel unified with a process table may comprise: a support(140) oriented along scribing lines formed on the glass panel, and supporting the glass panel in a lower part; vertical movement devices(130) attached to at least one side of the support(140); and a breaking bar(110) mounted on upper parts of the vertical movement devices(130).

The support(140) is oriented along the scribing lines formed on the glass panel, and supports the glass panel in a lower part. The support(140) supports both sides of the glass panel received in an upper part of the process table in a lower part within the scribing lines formed on both sides of the glass panel by being individually installed on both right and left sides of the process table of the laser cutting device. As such, the support(140) supports a lower side of the glass panel when the breaking bar(110) cuts the glass panel by applying pressure to cutting sections of the glass panel on an upper side of the glass panel.

The vertical movement devices(130) are attached to one side of the support(140), and vertically move the breaking bar(110) in a Z-axis direction. The vertical movement devices (130) are installed under the breaking bar(110) to vertically move the breaking bar(110). Accordingly, the process table-unified breaking apparatuses described herein can vertically move the breaking bar(110) using the vertical movement devices(130) attached to one side of the support(140) without requiring a separate structure in an upper part thereof.

In an embodiment, the vertical movement devices(130) are configured to include cylinders, so that the breaking bar(110) is positioned on top of the cylinders while the breaking bar (110) moves vertically up and down by the cylinders.

The breaking bar(110) is formed in an oblong bar shape along the scribing lines formed on either side of the glass panel. Each breaking bar(110) is individually disposed on either the right or left side of the glass panel, and moves vertically in concert with the vertical movement devices(130) to cut the glass panel formed with the scribing lines by applying pressure to the glass panel on an upper side.

In an embodiment, the breaking bar(110) includes cutting sections in a "square without a right side" shape in order to cut the glass panel on the outside of the scribing lines formed on the sides of the glass panel. By forming the cutting sections of the breaking bar(110) in the "square without a right side" shape, one side of the breaking bar(110) may be attached to the vertical movement devices installed in the lower part while the other side cuts the glass panel by applying pressure via the cutting sections to the glass panel in an upper part on both sides of the glass panel.

In an embodiment, the breaking bar(110) includes a plurality of holes on each side of the breaking bar(110). By forming the plurality of the holes on each side of the breaking bar(110), it is possible to reduce overall weight of the breaking bar(110), thereby reducing overall weight of the breaking apparatus.

In an embodiment, the process table-unified breaking apparatuses can further comprise rotating devices(120). The rotating devices(120) rotate a breaking bar(110) by being individually attached to both sections of the breaking bar (110).

In an embodiment, the process table-unified breaking apparatuses attach the rotating devices(120) to both sections of the breaking bar(110), and the vertical movement devices (130) are individually attached to both sections of the support (140). The vertical movement devices(130) vertically move the rotating devices(120) attached to both sections of the breaking bar(110) by attaching the rotating devices(120) to upper parts, and the breaking bar(110) combined with the rotating devices(120) also vertically moves as the rotating devices(120) vertically move, so that the breaking bar(110) can cut the glass panel formed with the scribing lines by applying pressure to the glass panel in an upper part.

The rotating devices(120) rotate the breaking bar(110) by being attached to both sections of the breaking bar(110), so that the breaking bar(110) can be positioned on top of cutting sections of the glass panel only during breaking operations of the laser cutting device, and can minimize a space occupied by the breaking apparatuses within the laser cutting device by rotating the breaking bar(110) before or after the breaking operations.

The rotating devices(120) rotate the breaking bar(110) by being individually combined with both sections of the breaking bar(110). The rotating devices(120) rotate the breaking bar(110) around the X axis such that the breaking bar(110) is vertical to the glass panel when the glass panel is cut.

In an embodiment, the rotating devices(120) enable location control of the breaking bar by employing servo motors, and rotate the breaking bar(110) by delivering power in accordance with rotation of the servo motors to a plurality of pulleys and belts which connect the pulleys.

In an embodiment, the process table-unified breaking apparatuses further comprise a scrap unit(150) including an inclined surface on a first side. The scrap unit(150) is configured by the formation of the inclined surface on the first side such that cutting sections of the glass panel are discharged to an outer side of the laser cutting device after the glass panel is broken by the rotative and vertical movements of the breaking bar(110).

The scrap unit(150) is attached such that both ends of the scrap unit(120) are fixed to the rotating devices(120) which are installed on both ends of the breaking bar(110). The scrap unit(150) is equipped to be located on an outer side of the support(140). Therefore, the scrap unit(150) vertically moves in a Z-axis direction together with the breaking bar(110) and the rotating devices(120) when the breaking bar(110) and the rotating devices(120) are moved vertically by the vertical movement devices(130) installed on both ends of the support (140).

In a lower part of the process table-unified breaking apparatuses, a plurality of linear guides(160) may be installed to adjust a cutting width of the glass panel by enabling the breaking apparatuses located on the right and left sides of the process table to move in a Y-axis direction.

The breaking apparatuses can move in combination with the plurality of the linear guides(160) installed in the lower part of the breaking apparatuses by a Y-axis linear motor, thereby adjusting locations of the breaking apparatuses along with the cutting width of the glass panel.

Figure 4:
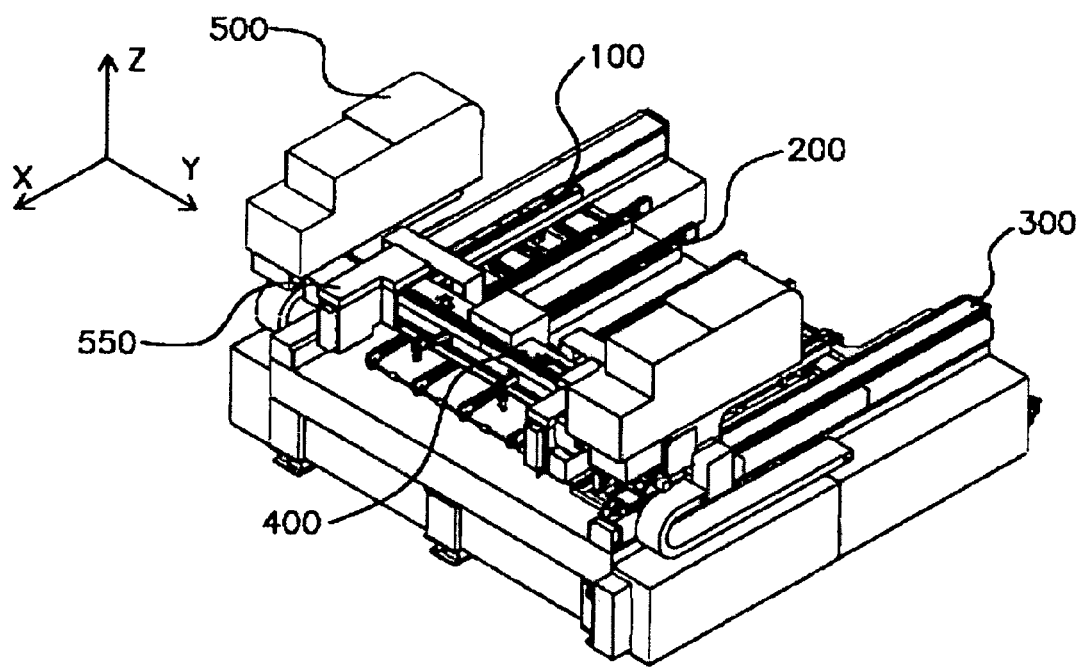
FIG. 4 is a perspective view illustrating apparatuses installed in a transfer-type cutting head laser cutting device for breaking a glass panel unified with a process table in accordance with an embodiment.

FIG. 4 is a perspective view illustrating apparatuses installed in a transfer-type cutting head laser cutting device for breaking a glass panel unified with a process table in accordance with an embodiment Referring to FIG. 4, the cutting head transfer-type laser cutting device comprises a process table(200) where the glass panel is received, breaking apparatuses(100) individually installed on both right and left sides of the process table(200), gantry stages(300) individually installed on outer sides of the breaking apparatuses(100), a gantry structure(400) moving in an X-axis direction along the gantry stages(300), laser oscillators(500) for emitting laser beams individually attached to respective ends of the gantry structure(400), and laser irradiation heads(550) for irradiating the laser beams emitted from the laser oscillators(500) on the glass panel.

When used with a transfer-type cutting head laser cutting device, the glass panel may be received by being fixed in horizontal state on the process table(200). The laser irradiation heads(550) located on both sides of the laser cutting device may move in a Y-axis direction along the gantry structure(400) to adjust a cutting width of the glass panel.

After adjusting the cutting width of the glass panel through movement of the laser irradiation heads(550), the gantry structure(400) located in an upper part of the transfer-type cutting head laser cutting device moves in an X-axis direction along the gantry stages(300). The laser oscillators(500) that emit the laser beams are fixed/attached to respective ends of the gantry structure(400), and the laser irradiation heads(550) for irradiating the laser beams emitted from the laser oscillators(500) are installed to move along the gantry structure (400).

Accordingly, as the gantry structure(400) moves in an X-axis direction along the gantry stages(300), the laser irradiation heads(550) and the laser oscillators(500) installed on both ends of the gantry structure(400) move in the X-axis direction as well such that the laser irradiation heads(550) irradiate the laser beams on the glass panel to form the scribing lines on both the right and left sides of the glass panel.

The apparatuses(100) for breaking the glass panel unified with the process table are individually installed on both the right and left sides of the process table(200) included in the transfer-type cutting head laser cutting device. Since the gantry structure(400) is located in an upper part of the cutting head transfer-type laser cutting device and moves in X-axis direction along the gantry stages(300), prior breaking apparatuses which require separate structures for breaking a glass panel by pressurizing the glass panel in the upper part of the laser cutting device cannot be used.

In an embodiment, the apparatuses(100) for breaking the glass panel unified with the process table are equipped with a plurality of linear guides(shown in FIG. 3) in lower parts to move in a Y-axis direction along the cutting width of the glass panel. For a transfer-type cutting head laser cutting device, because the laser irradiation heads(550) are movable in a Y-axis direction along the gantry structure(400) according to the cutting width of the glass panel, the breaking apparatuses (100) installed on both the right and left sides of the laser cutting device can also be movable in the Y-axis direction along the linear guides equipped in the lower parts of the breaking apparatuses(100).

Thus, the apparatuses(100) for breaking the glass panel unified with the process table can break the glass panel by adjusting locations of the breaking apparatuses(100) according to the width of the scribing lines formed on the glass panel.

In addition, since the apparatuses(100) for breaking the glass panel unified with the process table are installed to individually move in the Y-axis direction on both sides of the process table(200), it is available to break the glass panel formed with the scribing lines in the same space as a scribing process, thereby minimizing a layout space occupied by the laser cutting device.

Moreover, the apparatuses(100) for breaking the glass panel unified with the process table are installed on both sides of the process table(200) as one body. As such, no interference with the gantry structure(400) is caused during movement because of its position in the upper part of the transfer-type cutting head laser cutting device, solving a problem that prior breaking apparatuses are not usable for the transfer-type cutting head laser cutting device.

Figure 5:
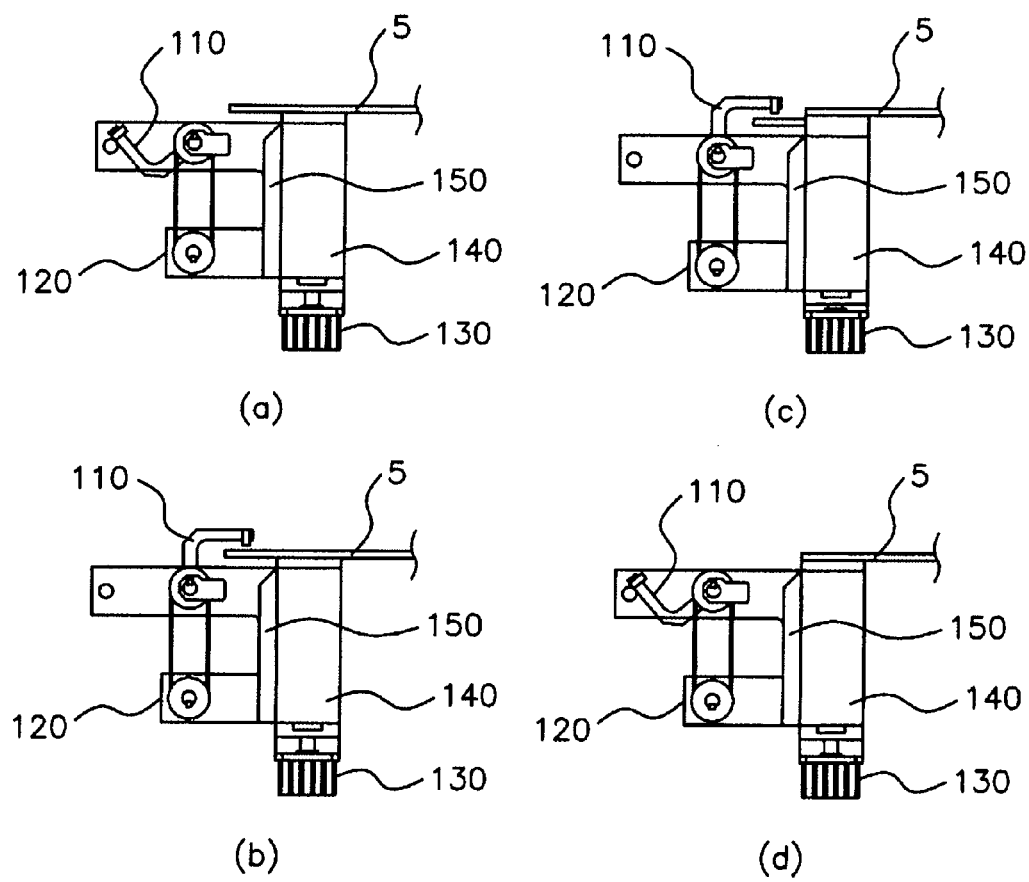
FIG. 5 illustrates a process of breaking a glass panel by apparatuses for breaking the glass panel unified with a process table in accordance with an embodiment.

FIG. 5 illustrates a process of breaking a glass panel by apparatuses for breaking the glass panel unified with a process table in accordance with an embodiment.

Referring to FIG. 5, in each apparatus for breaking the glass panel unified with the process table, if laser beams are irradiated to form scribing lines on both the right and left sides of a glass panel(5), a breaking bar(110) is rotated at an X axis, and the rest of components except for a support(140) among components of the breaking apparatuses move to a lower part in a Z-axis direction to cut the glass panel(5). The breaking apparatuses cut the glass panel(5) formed with the scribing lines by rotative and vertical movements of the breaking bar(110), and the breaking apparatuses reversely rotate again after both sides of the glass panel(5) are cut, then move to the original positions by moving in upper direction of the Z-axis direction.

In detail, FIG. 5(a) is a side view showing a figure that each component is positioned before the apparatuses for breaking the glass panel unified with the process table conduct breaking operations. Before conducting the breaking operations of the glass panel(5), a laser cutting device forms scribing lines on the glass panel(5) by irradiating laser beams on both sides of the glass panel(5). Once the scribing lines are formed on both sides of the glass panel(5), the breaking apparatuses installed on both sides of the process table of the laser cutting device individually move in a Y-axis direction along linear guides(not shown) disposed in lower parts of the breaking apparatuses to adjust cutting width of the glass panel(5).

FIG. 5(b) is a side view showing a figure after a breaking bar of each apparatus for breaking the glass panel unified with the process table is rotated. After scribing lines are formed by irradiating laser beams on both sides of the glass panel(5) and the cutting width is adjusted by movement in the Y-axis direction of the breaking apparatuses, the breaking bar(110) rotates around the X axis by rotating devices(120) installed on both ends of the breaking bar(110). The rotating devices(120) rotate the breaking bar(110) around the X axis, in order that the breaking bar(110) is positioned to be vertical to the glass panel by servo motors.

FIG. 5(c) is a side view showing a figure that the apparatuses for breaking the glass panel unified with the process table in accordance with an embodiment break the glass panel by pressurizing the glass panel after moving to a lower part in a Z-axis direction. After a breaking bar(110) rotates to be positioned to be vertical to a glass panel(5) by rotating devices(120), the breaking bar(110) moves to the lower part in the Z-axis direction by vertical movement devices(130) disposed on both ends of a support(140). Once the breaking bar(110) moves to the lower part, inner sides of the scribing lines formed on the glass panel(5) are supported by the support(140), and outer sides of the scribing lines are applied with pressure to a lower part by the breaking bar(110), so that both sides of the glass panel(5) are broken along the scribing lines.

FIG. 5(d) is a side view showing a figure that the apparatuses for breaking the glass panel unified with the process table rotate and vertically move to the original positions after breaking the glass panel. After breaking a glass panel(5) by pressurizing the glass panel along the scribing lines through rotation and falling of a breaking bar(110), the breaking bar(110) rotates again around the X axis in opposite direction to a direction in which the breaking bar rotates during breaking operations, then the breaking bar(110) moving to a lower part in the Z-axis direction moves to an upper part again to move to the original position.

It will be appreciated that various of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the disclosed embodiments.

What is claimed is:

1. A system for breaking a glass panel formed with scribing lines, comprising:
   a process table configured to receive the glass panel; and
   apparatuses in communication with the process table, wherein the apparatuses comprise:
   at least one support supporting a lower part of the glass panel, and oriented along the scribing lines;
   at least one vertical movement device provided in an area below the glass panel and near an edge of the glass panel while being out of the scribing line; and
   at least one rotating device provided on the vertical movement device and at least one breaking bar formed in oblong bar shape along the entire scribing line, cutting sections of the at least one breaking bar being formed in U-shape with an open face, one end of the U-shape being coupled to the at least one rotating device and the other end of U-shape being capable of being rotated over a upper part of the glass from a location under the glass panel by the at least one rotating device,
   wherein the at least one vertical movement device moves the at least one breaking bar and the at least one rotating device vertically downwards when the other end of the U-shape of the at least one breaking bar is located over the upper part of the glass and whereby the at least one breaking bar puts pressure in a direction from the upper part of the glass to the lower part of the glass panel along the entire scribing line at breaking operation.

2. The system of claim 1, wherein the at least one vertical movement device includes cylinders attached to both sections of the support, and wherein the at least one rotating device is mounted on upper parts of the cylinders such that both ends of each breaking bar are connected to the at least one rotating device.

3. The system of claim 1, wherein the apparatuses further comprise a scrap unit having one side formed as an inclined surface and installed to be positioned on an outer side of the support by fixing both ends thereof to the at least one rotating device.

4. The system of claim 1, wherein the apparatuses further comprise a plurality of linear guides for moving the at least one support, the at least one vertical movement device, and the at least one breaking bar in a direction vertical to the scribing lines.

5. The system of claim 1, wherein the apparatuses are installed on both sides of the process table of a laser cutting device which employs a method of moving laser cutting heads.

6. The system of claim 1, wherein a plurality of holes are formed on each side of the at least breaking bar.

7. The system of claim 6, wherein the apparatuses further comprise a scrap unit having one side formed as an inclined surface and installed to be positioned on an outer side of the support by fixing both ends thereof to the at least one rotating device.

8. The system of claim 6, wherein the apparatuses further comprise a plurality of linear guides for moving the at least one support, the at least one vertical movement device, and the at least one breaking bar breaking the glass along the scribing lines.

9. The system of claim 6, wherein the apparatuses are installed on both sides of the process table of a laser cutting device which employs a method of moving laser cutting heads.

10. The system of claim 1, wherein the apparatuses further comprise a plurality of linear guides for moving the at least one support, the at least one vertical movement device, and the at least one breaking bar breaking the glass along the scribing lines.

11. The system of claim 1, wherein the apparatuses are installed on both sides of the process table of a laser cutting device which employs a method of moving laser cutting heads.

12. The system of claim 1, wherein the at least one rotating device comprises:
servo motors for providing rotative power and controlling movement in accordance with the rotative power;
a plurality of pulleys for delivering the rotative power generated by the servo motors; and
belts for connecting the plurality of pulleys.

* * * * *